No. 628,349. Patented July 4, 1899.
J. S. NEWLIN.
AIR FEEDING APPARATUS FOR FURNACES.
(Application filed June 6, 1898.)
(No Model.)
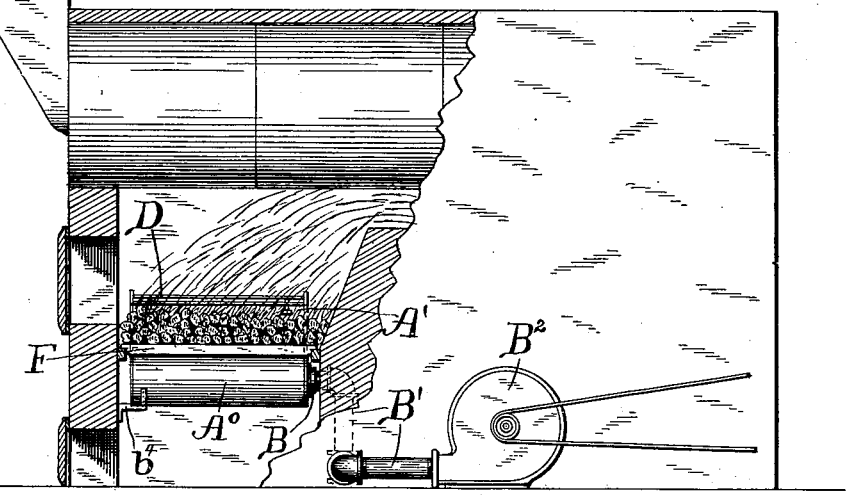
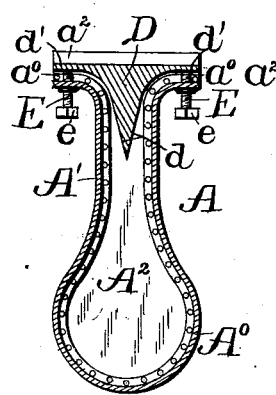
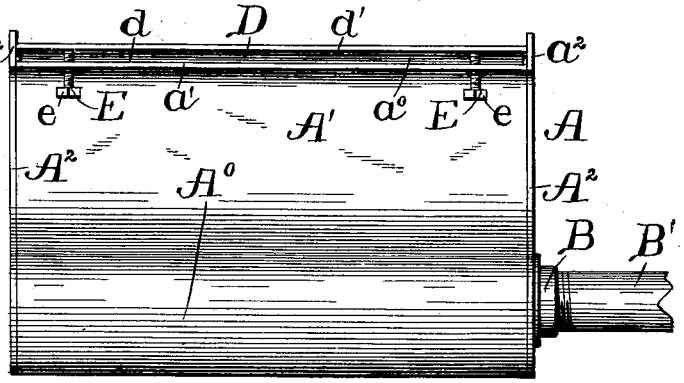
Witnesses
D. H. Blakelock
John Chalmers Wilson
Inventor
J. S. Newlin
by Wilkinson & Fisher
Attorneys

UNITED STATES PATENT OFFICE.

JOSEPH SIDNEY NEWLIN, OF AUGUSTA, GEORGIA.

AIR-FEEDING APPARATUS FOR FURNACES.

SPECIFICATION forming part of Letters Patent No. 628,349, dated July 4, 1899.

Application filed June 6, 1898. Serial No. 682,785. (No model.)

*To all whom it may concern:*

Be it known that I, JOSEPH SIDNEY NEWLIN, a citizen of the United States, residing at Augusta, in the county of Richmond and State of Georgia, have invented certain new and useful Improvements in Air-Feeding Apparatus for Furnaces; and I do hereby declare the following to be a full, clear, and exact description of the invention, such as will enable others skilled in the art to which it appertains to make and use the same.

My invention relates to improvements in apparatus for feeding air to boiler-furnaces; and it consists of the novel devices hereinafter described and claimed.

My said invention will be understood by reference to the accompanying drawings, wherein the same parts are indicated by the same letters throughout the several views.

Figure 1 represents a section through a boiler-furnace, showing my improved air-feeding apparatus therein in side elevation. Fig. 2 is a transverse section through the said air-feeding device, taken on the line 2 2 in Fig. 3 and looking to the left; and Fig. 3 represents a longitudinal side elevation of the air-feeding drum.

The air-drum consists of a hollow elongated chamber A, composed of heavy sheet metal, such as boiler-iron, and having an enlarged rounded base portion $A^0$ and upper reduced rectangular portion $A'$, the extreme upper edges of the reduced portion $A'$ being bent over outwardly, forming flanges $a'$ $a'$. The sides and bottom of the air-drum A are preferably formed of an integral sheet doubled and bent as shown in Fig. 2, and correspondingly-shaped heads $A^2$ are fitted upon and securely attached to the ends of the sheet so bent and extend slightly above the upper edges of the flanges $a'$ $a'$, as shown at $a^2$ in Figs. 2 and 3.

Into the head at one or both ends of the drum a pipe connection B is fitted for the attachment of an air-pipe $B'$ from a blower $B^2$ or similar means for forcing air into the said drum.

A deflector D, V-shaped in cross-section, as shown in Fig. 2, and having longitudinal side flanges $d'$ $d'$, which extend over the side flanges $a'$ $a'$ on the side edges of the drum, has its tapered edge $d$ extending downward into the reduced portion $A'$ of the drum A and is supported at its side edges above the flanges $a'$ $a'$ on the upper edges of the drum by means of adjustable screw-bolts E, having angular heads $e$, by which they may be turned. These screw-bolts may engage in fixed nuts on the flanges $a'$ $a'$ of the drum and support the deflector upon their upper ends, as shown, or these screw-bolts may engage in fixed nuts on the side flanges $d'$ $d'$ of the deflector D and support the said deflector by resting at their ends upon the flanges $a'$ $a'$ of the drum, as preferred. The object of these screw-bolts is to enable the width of the space $a^0$ at either side of the deflector D to be varied at will by simply turning the said screw-bolts by means of an iron wrench, which may be inserted through the door of the furnace, as will hereinafter more fully appear.

The air-drum above described is fitted into a furnace in some such manner as shown in Fig. 1, wherein it will be seen that one end of the said drum is supported upon a bracket $b^4$, while the other end is supported simply by the air-inlet pipe B. The enlarged rounded base portion of the drum fits closely up under the grate-bars F, while the reduced upper portion of the said drum extends upward between the grate-bars a sufficient distance to bring the air-outlet openings $a^0$ $a^0$ above the fuel upon said grate-bars, as seen in said Fig. 1.

In operation the air is forced, by means of a blower $B^2$ or other suitable means, through a feed-pipe B into one end, or, if preferred, into both ends, of the drum A, whence it escapes past the deflector D out through the passages $a^0$ $a^0$ across the furnace, just above the fuel therein. The effect of this air being forced into the furnace and blown across the mass of burning fuel is to create perfect combustion and to prevent the escape of but very little, if any, smoke from the furnace.

I do not wish to limit myself to the form of furnace herein shown, nor do I wish to limit myself to the precise arrangement of the air-drum and its air-supply connections; but

What I claim, and desire to secure by Letters Patent of the United States, is—

1. In an apparatus for assisting combustion in furnaces, the combination with a hollow elongated air-drum having a reduced upper side open at the upper edge and provided at said edge with outwardly-extending flanges thereon; of a V-shaped deflector mounted in the said open upper edge of said drum; and means for adjusting said deflector to vary the size of the air-outlet, substantially as described.

2. In an apparatus for assisting combustion in furnaces, the combination with a hollow elongated drum having a reduced upper side open at the upper edge and provided at said edge with outwardly-extending flanges thereon; of a V-shaped deflector having oppositely-disposed side flanges, mounted in the said open upper edge of said drum; and adjustable screw-bolts supporting said deflector upon said flanges of said drum, substantially as described.

3. In an apparatus for assisting combustion in furnaces, the combination with an elongated air-drum reduced along its upper side flaring outward at the top and having oppositely-disposed lateral openings at its upper edge; of means for varying the size of said lateral openings; and means for admitting air to said drum, substantially as described.

4. In a furnace, the combination with the grate-bars thereof, of an elongated hollow air-drum fixed beneath said grate-bars, and having a narrow portion extending upwardly through the said grate-bars and to a short distance above the same flaring outward at the top, and having oppositely-disposed lateral openings at its upper edge; means for varying the size of said openings, and means for forcing air through said drum, substantially as described.

In testimony whereof I affix my signature in presence of two witnesses.

JOSEPH SIDNEY NEWLIN.

Witnesses:
A. H. PORTER,
J. D. HILTON.